United States Patent Office 3,088,784
Patented May 7, 1963

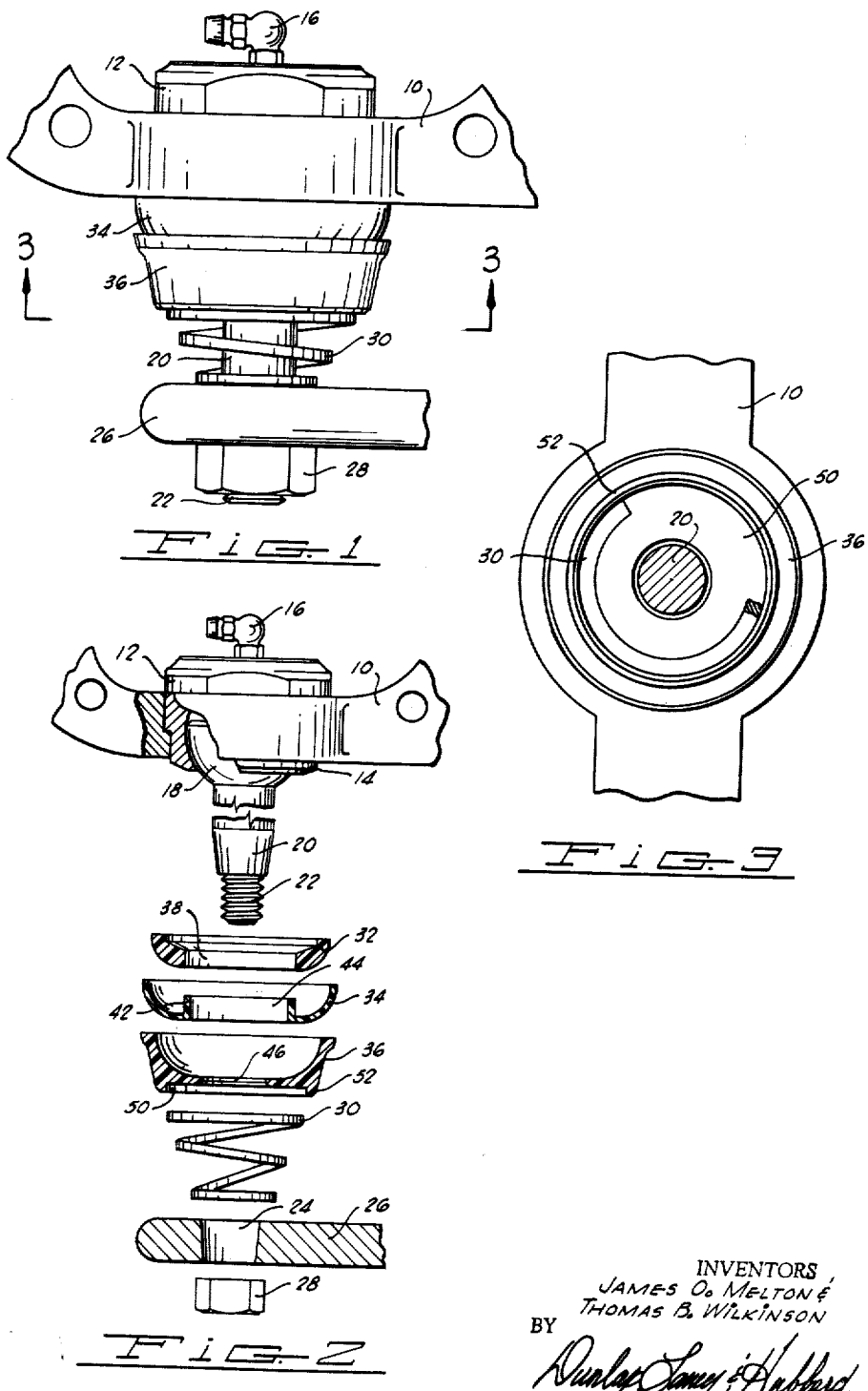

3,088,784
BEARING ASSEMBLY FOR CONNECTING TWO RELATIVELY MOVING MEMBERS
James O. Melton, 1208 Cruce St., Norman, Okla., and Thomas B. Wilkinson, 5925 S. Eggleston, Oklahoma City, Okla.
Filed Nov. 24, 1961, Ser. No. 154,779
9 Claims. (Cl. 308—72)

This invention relates to a bearing means, and more particularly, but not by way of limitation, to improvements in a pivotal bearing assembly which is utilized to connect two members which move relatively to each other. In a more specific, but nonlimiting aspect, the invention relates to a ball joint assembly utilized to connect relatively moving elements of the front suspension system of an automobile.

In the manufacture of automobiles today, ball joint type bearings are widely used in the steering mechanisms and suspension systems of the front wheels in order to promote the ease with which the automobile may be steered, and also to improve the riding quality of the automobile. For example, a ball joint type bearing is used in the pivotal coupling between the steering control arm and the steering knuckle of the steering wheel. In such ball joints, the mating surfaces of the spherical member, or ball, and the socket member in which the ball is located become worn over extended periods of use so that rattles are developed in the assembly. Such wearing of the mating surfaces also produces play in the assembly between the ball member and the enclosing socket so that the driver of the automobile has less control over its steerage than is desirable.

Previously, attempts have been made to overcome such play and rattles by inserting some type of resilient member in the assembly for the purpose of constantly urging the ball member against one side of the socket member. Although this arrangement has tended to reduce the play and rattle which develops in the ball joint assembly over extended periods of use, it has also had the detrimental effect of increasing the frictional resistance to turning. Moreover, the use of such a resilient member has not been effective to prevent the occurrence of further wear which is caused by the entrance of foreign matter into the socket member, such as the ingress of muddy water and dust which are encountered by the ball joint assembly utilized in an automobile steering mechanism.

In our co-pending application for U.S. Letters Patent filed on December 19, 1960, assigned Serial No. 76,600 and entitled Ball Joint Assembly, an improved ball joint assembly which includes a novel bearing means is disclosed. This novel bearing means comprises a metallic washer which is recessed on one of its sides for receiving and seating one end of the helical spring used in such joints, a cup-shaped thrust washer of high density synthetic resin which is pressed into a recess on the opposite side of the metallic washer, and a frusto-spherically shaped bearing washer which is also constructed of a high density synthetic resin and which cooperates with the peripheral concave surface of the cup-shaped thrust washer to reduce friction in the assembly. In a preferred construction of the ball joint assembly disclosed in said patent application, the cup-shaped thrust washer is constructed of a high density synthetic resinous material which has a different molecular structure from the resinous material of which the frusto-spherical bearing washer is constructed. The great advantage which accrues from this construction is the improvement in the relative ease with which the members interconnected by the joint can be turned relative to each other. Also, of course, the utilization of the high density resin is a more economical construction than those in which ball bearings or other metallic bearing members are employed.

Although ball joints constructed as described in said co-pending application constitute a notable advance in the art of ball joint assemblies, the particular construction therein described is peculiarly adapted for utilization with a ball joint of the type in which the ball is encased in a socket which is substantially frusto-spherical in its external configuration. The synthetic resin elements of the bearing assembly are therefore peculiarly adapted for cooperation with these particular types of sockets, and cannot easily be utilized with the types of ball joint sockets having a cylindrically shaped external surface as opposed to the described frusto-spherical shape. Moreover, the particular construction which is utilized still requires the use of a somewhat sophisticated metallic washer for supporting and aligning the high density synthetic resin bearing elements which are used therein.

The present invention constitutes an improvement over the ball joint assembly disclosed in our cited co-pending application in that it is adapted for use with the types of ball joint sockets where the ball member is contained within a socket or casing having a cylindrically shaped external periphery. The ball joint assembly of the present invention also is characterized by its substantially all-plastic construction which permits the metallic washer utilized in previous assemblies of this type be eliminated. Additionally, one of the most important features of the present invention is the utilization in the ball joint assembly of a minimum amount of the more expensive of the two dissimilar plastics whch form the contacting bearing surfaces of the assembly. In other words, the concept of providing two dissimilar high density synthetic resins in bearing contact with each other has been preserved in the present invention, but a substantial improvement in economy in the construction of such assemblies has been realized by the development of a novel construction which utilizes a minimum amount of the more expensive of the two plastics which are employed.

Turning to a brief preliminary description of the ball joint assembly of the present invention, the assembly includes, of course, the usual ball member having a stud which projects therefrom and passes through an aperture in one of the two relatively moving members which are to be interconnected by the assembly. As has been indicated, however, the ball member is encased in a socket, the external peripheral of which is generally cylindrical in configuration. Interposed between such socket member, which is a part of one of the relatively moving members, and the second of the two relatively moving members, is the novel dissimilar plastic bearing of the invention. This bearing includes (a) a generally annular synthetic resin cup washer which is placed around the stud, and which mates with the outer periphery of the generally cylindrical socket, (b) a high density synthetic resin sheath which fits over and covers the exposed convex surface of the synthetic resin cup washer, and (c) a high density synthetic resin thrust washer which encircles the stud and is compressively retained in mating contact with the synthetic resin sheath by a helical spring which bears against the second relatively moving member through which the stud is passed. Both the annular cup washer and the thrust washer of the bearing are constructed of the least expensive of the two dissimilar plastics which are to constitute the contacting bearing surfaces. The high density synthetic resin sheath of the assembly, is of a relatively thin dimension and is provided primarily as a bearing surface covering the relatively thick cup washer. This synthetic resin sheath is constructed of a resin which differs in its molecular structure from the resin employed in the cup washer and thrust washer, and is provided with an annular flange which is press fitted into the central aperture of the cup washer and thus frictionally interlocks these two elements for turning movement together.

It will be apparent from the description thus far developed that the contacting bearing surfaces of the ball joint assembly which move relatively to each other are constituted by the contacting surfaces of the sheath and the thrust washer. Since these two materials are constructed of plastics of dissimilar molecular configuration, there is no tendency for the molecules in the contacting surfaces to interpolymerize thus producing sticking or binding of the two elements to each other in resistance to relative movement.

From the foregoing description, it will be apparent that a major object to the present invention is to provide a strong, relatively inexpensive ball joint assembly which possesses improved anti-frictional characteristics.

An additional object of the present invention is to provide a substantially all-plastic ball joint assembly which may be utilized with those types of ball and socket joints in which the socket portion of the joint is possessed of a generally cylindrical outer periphery.

A further object of the present invention is to provide a ball joint assembly which will improve the steering performance of automobiles.

Another object of the invention is to provide a ball joint assembly in which the ball is maintained in contact with its socket member at all times during the life of the assembly by virtue of the constantly applied bias of the compression spring member.

An additional object of the present invention is to provide a ball joint assembly which will prevent the ingress of water, mud, dirt and other deleterious materials to the bearing surfaces and to the interior of the socket which contains the ball member.

Other additional objects and advantages will become apparent, and those hereinbefore described will be better understood, by referring to the following description in conjunction with the attached drawings which illustrate our invention.

In the drawings:

FIGURE 1 is a view in elevation of a ball joint assembly constructed according to the present invention and adapted for use in the steering system of an automobile.

FIGURE 2 is an exploded view of the ball joint assembly illustrated in FIG. 1 with the high density synthetic resin elements of the assembly shown in section, and a portion of the socket which contains the ball member broken away for purposes of illustration.

FIGURE 3 is a sectional view taken along line 3—3 of FIG. 1.

Referring now to the drawings in detail, and particularly to FIG. 1, reference character 10 designates a rigid structural member which is one of the two relatively moving members interconnected by the ball joint assembly of the present invention. The member 10 has incorporated therein a housing member or socket 12 which projects from opposite sides of the member 10. The lower side 14 of the socket 12 is of generally cylindrical configuration as shown in FIG. 2. A grease fitting 16 is provided in the top of the socket 12 to facilitate the injection of grease into the socket.

Referring next to FIG. 2, a hemispherical ball member 18 is fitted in the socket 12 with its periphery in mating contact with the internal walls of the socket. A stud 20 projects downwardly from the hemispherical ball member 18 and is threaded at its end opposite the end connected to the ball member as designated by reference character 22. In the assembled, operative position of the ball joint assembly, the stud 20 extends through an aperture 24 formed in the second of the two relative moving members, such as the steering knuckle 26 of an automobile, which the ball joint assembly interconnects.

A nut 28 is threaded upon the end of the stud 20 which projects through the aperture 24.

It will be understood that the socket 12 is of a size to provide a tight sliding fit of the ball member 18 therein when the assembly is new. However, after a relatively short operating period, the cooperating surfaces of the ball member 18 and the socket 12 will become worn so that the ball member 18 fits rather loosely in the socket member, and a certain amount of play and rattling would tend to develop. In order to reduce or eliminate the looseness and play which eventually develop between the ball member 18 and its enclosing socket 12, a helical compression spring 30 is generally interposed between the socket 12 and the steering knuckle 26. By positioning the helical compression spring 30 between the steering knuckle 26 and the socekt 12, the ball member 18 is constantly urged into contact with the inner surface of the socket 12.

Although the use of the helical compression spring 30 greatly aids in the reduction of looseness or play occurring in the ball joint, the utilization of such a spring in contact with the socket 12 amplifies the frictional resistance to pivotation of the ball member 18 in its socket 12 and makes turning of the automobile considerably more difficult than is the case in a newly assembled ball joint not using such a spring where contact of the ball member 18 with the socket 12 provides the only frictional resistance to turning. Moreover, the helical compression spring 30 does not provide any effective seal against the infiltration of mud, water and dirt into the socket 12 during the operation of the automobile. Finally, the bias of the spring 30 is not distributed evenly to the outer periphery of the socket 12 during all operating conditions to which the ball joint may be subjected. Thus, when the ball member 18 and its associated stud 20 are pivoted to an extreme position with respect to the socket 12, a greater force is likely to be imposed upon the socket 12 by one side of the compression spring 30 than is imposed by the opposite side of the spring.

The performance of a ball joint assembly of the type illustrated is vastly improved by the employment of several high density synthetic resin elements constructed according to the teaching of the present invention, and interposed between the steering knuckle 26 and the socket 12. The several high density resin members collectively constitute a novel bearing and comprise (a) a centrally apertured, generally annular high density synthetic resin cup washer 32 (b) a centrally apertured, annular sheath 34 which frictionally engages the resinous cup washer and is shaped to cover the entire exposed convex surface of the cup washer, and (c) a thrust washer 36 which is also constructed of a high density synthetic resinous material, and is of a configuration to mate with the outer periphery of the sheath 34. The three plastic members 32, 34 and 36 are each characterized by a central aperture and concentrically surround the stud 20 between the steering knuckle 26 and the outer periphery of the socket member 12.

Considering first the specific construction of the high density synthetic resin cup washer 32, this element of the ball joint assembly is of a shape to mate with the generally cylindrical outer peripheral surface of the socket 12 which projects from the lower side of the member 10. The cup washer 32 is made relatively thick for enhanced structural strength, and is provided with an aperture 38 through the center thereof which is considerably larger in diameter than the diameter of the stud 20.

The bearing sheath 34 comprises an annular centrally apertured, generally cup-shaped member whose inner surface is complementary in configuration to the outer or exposed convex surface of the cup washer 32. An annular flange 42 which is constructed of the same high density synthetic resin material as the sheath 34 is secured to the sheath around the central aperture 44 thereof and extends in an axial direction with respect to the stud 20.

The flange 42 is diametrically dimensional to be frictionally pressed into the central aperture 36 in the cup washer 32 so that the cup washer 32 and sheath 34 are retained in juxtaposition to each other when the ball joint is assembled. The thickness of the flange 42 is such that a minimum clearance between the inner peripheral surface of the flange, and the outer periphery of the stud 20 exists in the assembled joint. This arrangement prevents an ingress of mud, water and other deleterious materials to the interior of the socket 12, and also prevents such materials from creeping along the stud 20 to a position opposite the contacting surfaces of the sheath 34 and the thrust washer 36. The latter function is of considerable importance to the efficient operation of the invention, since contacting surfaces of the sheath 34 and thrust washer 36 are bearing surfaces which move relatively to each other upon movement of either the member 10 and/or the steering knuckle 26.

The third plastic element of the ball joint assembly is the cup-shaped thrust washer 36 which functions to transmit the thrust exerted by the helical compression spring 30 through the sheath member 34 and the cup washer 32 to the socket 12. The cup-shaped thrust washer 36 is characterized by an inner concave surface which is complementary in configuration to the convex outer surface of the sheath member 34. A central aperture 46 is provided in the bottom of the cup-shaped thrust washer 36 to permit the stud 20 to be passed therethrough. The cup washer 36 is recessed at its planar surface opposite its dished or concave surface as indicated by reference character 50. The recess 50 has a diametric dimension approximating that of the upper end of the helical compression spring 30 so that the compression spring may be seated in the recess 50 when the ball joint is assembled. In a preferred embodiment of the invention, the recess 50 is actually slightly smaller in diameter than the uppermost convolution of the coil spring 30 so that the flange 52 which defines the circumference of the recess is in constant frictional contact with the uppermost convolution of the spring when the spring is pressed into the recess.

As has been referred to above, the cup washer 32 and the thrust washer 36 are each relatively thick and sturdy as compared to the thin sheath 34 which forms a bearing surface in contact with the thrust washer 36. In utilizing the thin sheath member 34 as one of the relatively moving bearing elements of the invention, a substantial economy in construction costs is realized over those assemblies which utilize two relatively thick contacting bearing elements constructed of the dissimilar plastics. Thus, by constructing both the cup washer 32 and the thrust washer 36 of the ball joint assembly of the present invention of the least expensive of the two dissimilar plastics which are to be used in the joint, the sheath 34 which fits over and is frictionally secured to the cup washer 32 may be made of a relatively small amount of the more expensive second dissimilar plastic. The use of the sheath member 34 does not result in a loss of structural or mechanical strength, however, since this element of the assembly is firmly reinforced and supported by the thick cup washer 32, which in turn is in contact with the socket 12 over a large area.

As a second advantage of the illustrated construction may be cited the ease with which the sheath 34 may be replaced when it has become distorted in shape or worn thin by extended periods of use. It is only necessary to pry the worn sheath 34 away from the cup washer 32 and replace the old sheath with a new one.

Although the foregoing described advantages are characteristic of any two dissimilar high density synthetic resin plastics which shall be utilized in the construction of the ball joint assembly of the invention, we prefer to utilize nylon as the resinous material of construction of the sheath 34 and to use high density polymerized ethylene, such as that sold under the trademark Marlex as the material of construction for the cup washer 32 and the thrust washer 36. However, provided the resin which is utilized in the construction of the cup washer 32 and thrust washer 36 be of different molecular constitution than the resin used in the construction of the sheath 34, a number of other high density resins characterized in having relatively low coefficients of friction may be utilized in the ball joint assembly. Some of these include a high density polycarbonate resin sold under the trademark Lexan, polymerized tetrafluoroethylene, such as is sold under the trademark Teflon and polymerized trifluorochloroethylene, such as is sold under the trademark Kel-F.

For illustrative purposes, this invention has been described as it particularly relates to automobile steering mechanism assemblies. It is, however, apparent that the principles of the invention may be adapted to any ball joint type bearing mechanism which is utilized to connect two relatively movable members, whether used in automobile assemblies or otherwise.

It will be manifest to those skilled in the art that certain details of construction may be modified or altered to meet certain existing operating conditions or aims without departing from the spirit and scope of the invention as defined in the appended claims.

We claim:

1. A bearing assembly comprising:
   a metallic socket member having a generally cylindrical outer surface, a frusto-spherical inner surface, and an aperture extending through said socket and concentrically surrounding the axis of said cylindrical portion;
   a ball member in said socket positioned for pivotation on said frusto-spherical inner surface;
   a stud secured to said ball member and extending loosely through said aperture;
   a centrally apertured, generally annular, high density synthetic resin cup washer around said stud in contact with said cylindrical outer surface, said cup washer having an inner surface complementary in configuration to the cylindrical outer surface of said socket, and further having an outer surface opposite its inner surface;
   a centrally apertured, annular, high density synthetic resin sheath around said stud covering the outer surface of said cup washer, said sheath having one of its surfaces complementary in configuration to the outer surface of said cup washer, and having its surface opposite said one surface of generally convex configuration;
   a connecting arm connected to the lower end of said stud for movement relative to said socket member;
   and a high density synthetic resin thrust washer around said stud and compressively retained between said connecting arm and said sheath, said thrust washer having a dished surface complementary in configuration to the generally convex surface of said sheath and mating therewith to form a bearing.

2. A bearing assembly as claimed in claim 1 wherein said sheath and said thrust washer are resinous members of differing molecular constitution whereby said sheath and said thrust washer may move freely relative to each other without binding due to the occurrence of polymerization of ther esins of said sheath and said thrust washer.

3. A bearing assembly as claimed in claim 2 wherein said cup washer and thrust washer are constructed of high density polymerized ethylene, and said sheath is nylon.

4. A bearing assembly as claimed in claim 1 and further characterized to include a helical spring around said stud retained under compression between said connecting arm and said thrust washer.

5. A bearing assembly as claimed in claim 4 wherein said thrust washer is recessed at its planar surface opposite said dished surface;

and said helical spring is of diminishing cross-sectional diameter from its end in contact with said thrust washer to its end in contact with said connecting arm, said spring being received by said recess in said thrust washer at the end of said spring in contact with said thrust washer.

6. A bearing assembly as claimed in claim 1 and further characterized to include means for constantly maintaining said sheath and said cup washer in juxtaposition to each other with their complementary surfaces in contact with each other.

7. A bearing assembly as claimed in claim 6 wherein said means for maintaining said sheath and said cup washer in juxtaposition to each other comprises an annular, axially extending flange secured to said annular bearing member around the central aperture thereof and pressed into the central aperture in said cup washer.

8. In a ball and socket joint of the type having a ball member, a socket housing said ball member, a stud extending from said ball member through said socket, and an arm connected to the end of said stud outside said socket, the improvement for continuously maintaining the ball in contact with the socket which comprises:

a centrally apertured, generally annular, high density synthetic resin cup washer around said stud and having its inner surface in mating contact with the outer surface of said socket;

a centrally aperture, annular, high density synthetic resin sheath around said stud in contact with said cup washer and covering the outer surface of said cup washer, said sheath having one of its surfaces complementary in configuration to the outer surface of said cup washer, and having its surface opposite said one surface of generally convex configuration;

an annular flange secured to said annular sheath around the central aperture thereof and pressed into the central aperture in said cup washer for frictionally retaining said annular cup washer and sheath member in juxtaposition to each other;

and a high density synthetic resin thrust washer around said stud and compressively retained between said connecting arm and said sheath, said thrust washer having a dished surface complementary in configuration to the generally convex surface of said sheath and mating therewith to form a bearing.

9. The improvement claimed in claim 8 wherein said sheath and said thrust washer are resinous members of differing molecular constitution whereby said sheath and said thrust washer may move freely relative to each other without binding due to the occurrence of polymerization of the resins of said sheath and said thrust washer.

References Cited in the file of this patent

UNITED STATES PATENTS

| | | |
|---|---|---|
| 2,878,047 | Booth | Mar. 17, 1959 |
| 2,912,267 | Latzen | Nov. 10, 1959 |
| 3,010,733 | Melton et al. | Nov. 28, 1961 |

UNITED STATES PATENT OFFICE
CERTIFICATE OF CORRECTION

Patent No. 3,088,784                            May 7, 1963

James O. Melton et al.

It is hereby certified that error appears in the above numbered patent requiring correction and that the said Letters Patent should read as corrected below.

Column 6, line 65, for "ther esins" read -- the resins --; column 7, line 30, for "aperture" read -- apertured --.

Signed and sealed this 21st day of April 1964.

(SEAL)
Attest:
ERNEST W. SWIDER

Attesting Officer

EDWARD J. BRENNER

Commissioner of Patents